United States Patent [19]

Sugalski et al.

[11] 4,173,733

[45] Nov. 6, 1979

[54] BATTERY-CHARGER WITH LIQUID CRYSTAL CHARGE CURRENT INDICATOR

[75] Inventors: Raymond K. Sugalski; Charles R. Blake, both of Gainesville, Fla.

[73] Assignee: General Electric Company, Gainsville, Fla.

[21] Appl. No.: 910,517

[22] Filed: May 30, 1978

Related U.S. Application Data

[63] Continuation of Ser. No. 793,012, May 2, 1977, abandoned.

[51] Int. Cl.² .............................................. H02J 7/00
[52] U.S. Cl. ............................................ 320/48; 320/2; 340/366 R; 350/351
[58] Field of Search .................... 320/2, 48; 340/636, 340/366 B, 366 R; 350/330 E, 331, 332, 351; 73/356

[56] References Cited

U.S. PATENT DOCUMENTS

| | | |
|---|---|---|
| 2,451,726 | 10/1948 | Fry . |
| 3,421,142 | 1/1969 | Kircher .................................. 320/48 |
| 3,435,318 | 3/1969 | Mas . |
| 3,576,604 | 4/1971 | Hammond ........................... 73/356 X |
| 3,590,371 | 6/1971 | Shaw, Jr. ............................. 73/356 X |
| 3,696,283 | 10/1972 | Ackley ...................................... 320/2 |
| 3,746,961 | 7/1973 | Doble . |
| 3,817,103 | 6/1974 | Diamond et al. . |
| 3,827,301 | 8/1974 | Parker ...................................... 73/356 |
| 3,846,777 | 11/1974 | Brown . |
| 3,882,490 | 5/1975 | Tashiro .............................. 350/332 X |
| 3,920,996 | 11/1975 | Moore . |
| 4,006,414 | 2/1977 | Parker . |
| 4,009,429 | 2/1977 | Mullersman . |

*Primary Examiner*—Robert J. Hickey
*Attorney, Agent, or Firm*—Morgan, Finnegan, Pine, Foley & Lee

[57] ABSTRACT

A charging system for alternatively charging cells having different physical sizes and/or electrical characteristics comprising a charge current source, a plurality of cellholder modules and interconnection means on said charger and said modules for selective alternative connection of each of said modules to the charger. Each module includes a liquid crystal indicator for indicating when cells in the module are being charged.

9 Claims, 9 Drawing Figures

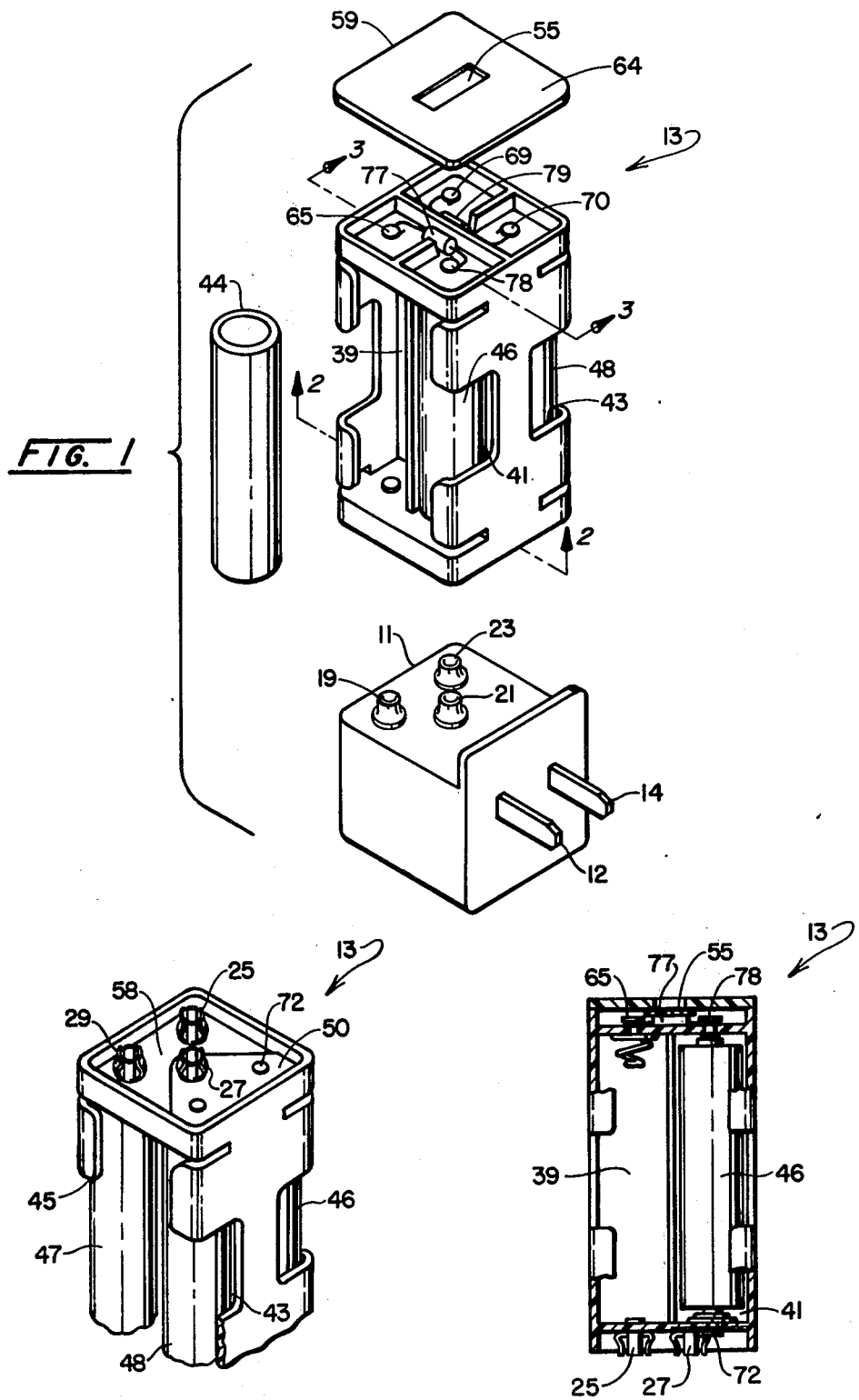

BATTERY CHARGER WITH LIQUID CRYSTAL CHARGE CURRENT INDICATOR

This is a continuation, of application Ser. No. 793,012 filed May 2, 1977, now abandoned.

BACKGROUND OF THE INVENTION

This invention relates to chargers for rechargeable batteries and more particularly to a simple, inexpensive indicator for indicating when cells in the charger are being charged.

In a prior art consumer charger such as shown in U.S. Pat. No. 4,009,429, the disclosure of which is hereby incorporated by reference herein, no mechanism is provided to indicate when the charger is actually providing charge current to cells disposed in the charger for charging. This has been found to be undesirable because the operator after loading cells in the charger and attaching the charger to a power supply cannot immediately identify whether the cells in the charger are being charged. With this system the determination of whether the cells are being charged can only be made by testing or using the cells after being connected to the charger for a few hours. The cells would not be charged, for example, if one of the cells is defective, if one or both cells is installed with its polarity reversed, if one or both of the cells is making poor electrical contact with the charger terminals, if no power is supplied to the charger, if the charger is defective or if only one cell is positioned in the charger.

In prior art chargers, it is known to use an electric lamp to indicate the flow of a charging current. Such chargers are disclosed in U.S. Pat Nos. 3,245,726, 3,421,142 and 3,746,961. Such an indicator has been found to be disadvantageous in miniaturized, wall-mounted charges because it must be energized by the charging circuit and thus a larger transformer is required to energize the load provided by the cell(s) and the indicator. All of these factors add both cost and weight to the charger, both of which are critical in such chargers.

Accordingly, it is an object of this invention to provide a charger with the indicator which does not require electrical energization by the charging circuit.

It is another object of this invention to provide a charger with a small, light weight indicator.

It is another object of this invention to provide a charger with an indicator which gives a rapid indication of whether charge current is being supplied to the cells mounted in the charger.

SUMMARY OF THE INVENTION

These and other objects of the invention, which will be apparent from the consideration of the detailed description below and accompanying claims, are accomplished by a charger comprising a charger housing; a circuit in said housing for connection to a power source and for supplying charger current to a cell connected in the circuit, the circuit comprising a heat-generating circuit element; and a liquid crystal indicator for indicating the flow of charge current through the circuit element responsive to the change in temperature of the element, the indicator being fixed in a wall of the housing in a position adjacent to the circuit element and outwardly visible.

BRIEF DESCRIPTION OF THE DRAWINGS

FIG. 1 is an exploded perspective view of a charger current source and a "AA" cellholder module in accordance with the features of this invention.

FIG. 2 is a fragmentary, perspective view of the lower end of the module of FIG. 1 taken along line 2—2.

FIG. 3 is a fragmentary cross-sectional view of the module of FIG. 1 taken along line 3—3.

DESCRIPTION OF THE PREFERRED EMBODIMENT

Figure 4:
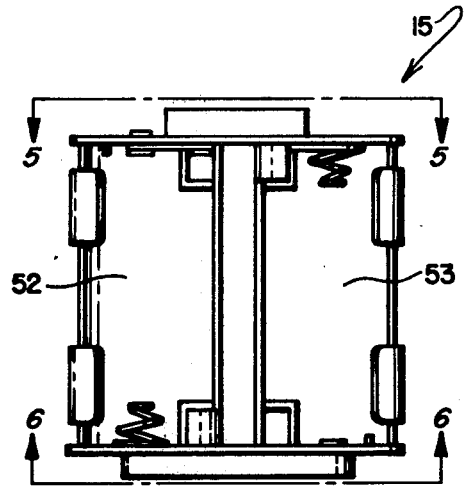
FIG. 4 is an elevational view of one side of a "C" cellholder module in accordance with the features of this invention.

A preferred embodiment of this invention is shown in FIGS. 1 and 4. This preferred embodiment is identical to that disclosed in the aforementioned U.S. Pat. No. 4,009,429 except that in accordance with the features of this invention, a liquid crystal charge current indicator is provided. The charger is generally comprised of a charge current source 11 and a plurality of cellholder modules 13, 15. The housing of the source 11 and modules 13 or 15 is collectively referred to herein as the charger housing. FIG. 1 is an exploded perspective view of the relationship assumed by source 11 and module 13 when connected for charging. FIG. 4 is an elevational view of module 15 which is connectible to source 11 for charging cells of another size.

For purposes of illustration only, cellholder modules are shown of two of the three common cell types, AA, C and D to which this invention in its preferred embodiment has direct application. The modules for size "C" and "D" cells are mechanically and electrically identical in construction except that the module for "C" size cells is physically dimensioned to accept the smaller "C" size cells and the module for "D" size cells is physically dimensioned to accept the larger "D" size cells. Accordingly, only the module for "C" size cell will be described as exemplary of both. However, as will be clear to those skilled in the art, the invention is not limited to any particular number of cellholder modules, nor is it limited to a system for charging any particular cell type.

The charge current source 11 is comprised of a conventional high impedance centertapped transformer (not shown). Two blades 12, 14 are provided on one face of the charger housing for connection to a source of 120 V AC.

Figure 5:
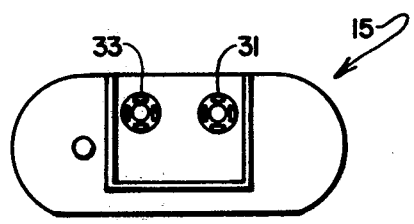
FIG. 5 is a plan view of top end of the module of FIG. 4 taken along line 5—5.

The modules 13, 15 are adapted to be selectively and alternatively connectible to the source 11 via interconnection means provided on source 11 as terminals 19, 21, 23 and on modules 13, 15 as terminals 25, 27, 29 (FIG. 2); and terminals 31, 33 (FIG. 5), respectively.

The modules are preferably of a molded plastic construction and each comprises a plurality of compartments for mounting cells of a particular type. As shown in FIGS. 1, 2 and 3, module 13 has four compartments, 39, 41, 43, 45 for accommodating four AA cells. Module 13 is shown with an "AA" cell 44 displaced outwardly of compartment 39.

Compartments 41, 43, 45 are shown with AA size cells 46, 48, 47 respectively disposed therein in charging position. Module 15 (FIG. 4) accommodates two "C" cells in a pair of compartments 52, 53.

Figure 6:
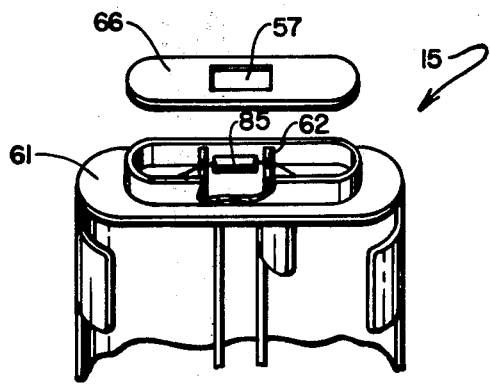
FIG. 6 is an exploded fragmentary, perspective view of the lower end of the module of FIG. 4 taken along line 6—6.

In accordance with the features of this invention, modules 13, 15 are provided with liquid crystal charge current indicators 55, 57 respectively. Indicators 55, 57 which consist of a flexible lamina containing a liquid crystal film, are adhesively fixed to the underside of backing members 64, 66, respectively are visible through openings provided in the backing members. Backing members 64, 66 (shown in FIGS. 1, 6 in an exploded view) are fixed to end walls 59, 61 such that each indicator 55, 57 is disposed in physical contact with heat-generating circuit elements (viz, diodes 77, 79 in module 13 and diode 85 elevated on support 62 in module 15) in the charge current circuits (shown in FIGS. 8, 9, respectively). When a charge current is flowing in the circuit (FIG. 8), a visually detectable change in color is provided by indicator 55 responsive to the change in temperature of either one or both diodes 77, 79 in module 13. Similarly, a visually detectable change in color is provided by indicator 57 in module 15 responsive to the change in temperature of diode 85 when a charge current is flowing in the circuit (FIG. 9). Indicators 55, 57 are sized such that a central portion of the indicator changes color responsive to the heat generated by the diode while the surrounding portion of the indicator has a contrasting color responsive to the ambient temperature. The total area of the indicator is preferably at least two to four times the area of the indicator in contact with the heat-generating circuit element.

The liquid crystal indicator, which is a microencapsulated cholesteric liquid crystal material such as is commercially available from Djinnii Industries, Dayton, Ohio, preferably has a visually detectable color change indicative of the flow of charge current in ambient temperatures between 50° and 95° F. and thus is operable in most ambient conditions to which the charger will be exposed during normal operation. For example, a visually detectable indication is provided on the indicator in about 15 sec. at 50° F. and about 2 sec. at 95° F. Thus, a rapid indication is provided of the fact that charge current is being supplied to cells mounted in modules 13, 15.

Figure 7:
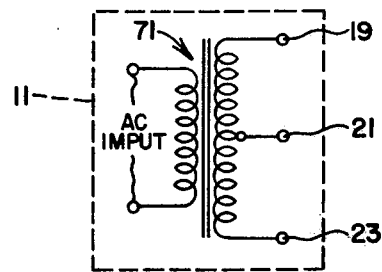
FIG. 7 is a circuit diagram of the charge current source of FIG. 1.
Figure 8:
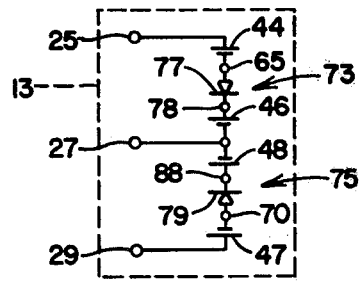
FIG. 8 is a circuit diagram of the module of FIG. 1.
Figure 9:
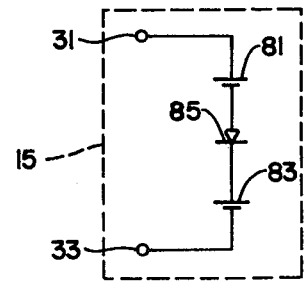
FIG. 9 is a circuit diagram of the module of FIG. 4.

FIGS. 7, 8 and 9 show a diagram of preferred embodiment of an electrical charging circuit for the charging system. FIG. 7 shows the circuit diagram of the charge current source 11. FIG. 8 shows the circuit diagram of module 13 for charging either two or four "AA" cells. FIG. 9 shows the circuit diagram for cellholder module 15 for charging two "C" cells. As explained above, a circuit diagram for "D" cellholder module is not shown because it is electrically identical to that of module 15 as shown in FIG. 8.

As shown in FIG. 7, the source 11 comprises a transformer 71 to make available from the standard 110-120 volt 60 cycle AC line an output current of the appropriate magnitude for the load provided by modules 13, 15, respectively. The terminal 21 is centrally tapped to the secondary of transformer 71 to provide equal and opposite AC input voltages for module 13.

As shown in FIG. 8, the circuit for module 13 comprises two sections 73, 75 for accommodating either two or four AA cells for charging. If only two cells are to be charged at one time, both of the cells must be disposed in the same circuit section so as to form a complete charge current path. Section 73 connects a pair of AA cells 44, 46 disposed in compartments 39, 41 in a series relationship for charging via a charge current path formed by connection of module terminals 25, 27 to charger terminals 19, 21, respectively. Similarly, section 75 connects a pair of AA cells 47, 48 disposed in compartments 43, 45 in a series relationship for charging via a charge current path formed by connection of module terminals 27, 29 to charger terminals 21, 23, respectively.

Diodes 77, 79 are connected in sections 73, 75, respectively to prevent the inadvertent shorting of the branches 73, 75 when disconnected from source 11. Diode 77 is connected between cells 44, 46 at contacts 65, 78. Diode 79 is connected between cells 47, 48 at contacts 69, 70. When cells are loaded in module 13, the cells in section 73, 75 are unable to deliver excessive power to a load connected between terminals 25, 27 and 29. Diodes 77, 79 also rectify the current supplied by source 11 when module 13 is connected thereto.

In FIG. 9, the circuit is shown for connecting a pair of "C" cells 81, 83 disposed in compartments 52, 53 (FIG. 4), respectively in a series relationship for charging via a charge current path formed by connection of module terminals 31, 33 to the charge current source terminals 19, 23, respectively. No connection is made to the centertapped source terminal 21 and thus the total AC voltage developed by the transformer 71 is applied to the circuit of module 15. A diode 85 is connected in the circuit of module 15 intermediate cells 81 and 83. Diode 85 provides the dual function of preventing inadvertent high rate discharge of the cells by shorting across terminals 31, 33 and rectification of the AC output from source 11 during charging.

While the preferred position of the diodes 77, 79 and 85 is, as shown in FIGS. 8 and 9, in series between adjacent series connected cells, it will be recognized that the diodes can be positioned electrically in series between the module terminal and one of the cells in the series connected pair. For example, in FIG. 9 the diode 85 can be positioned in series between terminal 31 and the positive terminal of cell 81.

Also, while it is preferred to position the diode in the module both to rectify the charge current and to prevent high rate discharge of cells in the module, it will be recognized that the rectification of charge current could be performed by the incorporation of rectification means in the circuit of transformer 71 in charge current source 11 and that the high rate discharge prevention function could be provided by a fuse or resistor in the respective sections of the module circuits. In this embodiment, the indicator would be provided in a wall of source 11 adjacent the diode.

Also, while it is preferred to operate the indicator responsive to the temperature change of a diode, other heat-generating circuit elements such as a resistor may be used to actuate the indicator. However, one advantage arising from the use of diode as the heat-generating circuit element relative to a resistor is that the power variation is many applications, caused by current fluxuation in the charge circuit, is much less for a diode than a resistor. This is so because for a diode the power varies linearly with current and for a resistor the power varies as the square of the current. Thus in many applications using a resistor, the power variation is beyond that which can be tolerated by conventional liquid crystal materials. Also it is desirable to use the charger in a wide range of ambients which even further constrains acceptable power variations. The current fluxuations result from inherent variation in standard line current and from the variation caused by the recharging of cells at various charge levels upon initiation of charging and cannot be controlled without adding cost and complexity to the charge circuit.

It will be recognized by those skilled in the art that while the invention has been described in connection with a preferred embodiment, it is not intended to be limited to the particular forms shown and described. Accordingly, the appended claims are intended to cover all such charger designs and modifications thereof which are in the true spirit and scope of this invention.

What we claim as new and desire to secure by Letters Patent of the United States is:

1. A battery charger comprising (a) a charger housing; (b) a circuit means in said housing for connection to a power source and for supplying charge current to a cell connected in said circuit means, said circuit means comprising a heat-generating circuit element; and (c) a liquid crystal indicator for indicating the flow of current through said element responsive to the change in temperature of said element, said indicator fixed in said housing in a position adjacent said element.

2. The charger of claim 1 wherein said charger housing comprises a charge current source housing and at least one cellholder module detachably connectible to said source housing; said circuit element is a diode in said module; and said indicator is fixed to an exterior wall of said module and is in contact with said element.

3. The charger of claim 2 wherein said module comprises compartment means for holding a pair of cells; said circuit means is for supplying charge current to a pair of celis; and said circuit element is connected in series between said pair of cells.

4. A battery charger comprising:
   a. a source of charge current comprising (1) a housing, (2) a transformer having a secondary winding disposed in said housing, and (3) first, second and third source terminals, said first and third source terminals connected to said winding, said second source terminal connected to said winding at a point intermediate of the connections of said first and third source terminals to said winding;
   b. a first cellholder module comprising (1) first, second and third module terminals for selective connection to said first, second and third source terminals, respectively; (2) compartment means for holding a plurality of cells for charging; and (3) first circuit means connecting at least one cell in series between said first and second module terminals and between said second and third module terminals, respectively, said circuit means comprising a first heat-generating circuit element; and
   c. a first liquid crystal indicator for indicating the flow of charge current through said element responsive to the change in temperature of said element, said indicator fixed in said module in a position adjacent said element.

5. The charger of claim 4 wherein said first circuit means is for connecting a first pair of cells in series with said first and second module terminals and is for connecting a second pair of cells in series with said second and third module terminals; and said first circuit elements are a pair of diodes, one connected in series between said first pair of cells and the other connected in series between the second pair of cells.

6. The charger of claim 4 further comprising:
   a. a second module comprising (1) compartment means for holding at least one cell of a physical size different from said compartment means of said first module, (2) first and second module terminals for connection, respectively, to said first and third source terminals, and (3) a second circuit means connecting said least one cell in series between said first and second module terminals, said second circuit means comprising a second heat-generating circuit element; and
   b. a second liquid crystal indicator for indicating the flow of a charge current through said second element responsive to the change temperature of said second element, said indicator fixed in said second module in a position adjacent said element.

7. The charger of claim 6 wherein said first and second circuit elements are diodes.

8. The charger of claim 6 wherein said second circuit means is for connecting a pair of cells in series between said first and second module terminals of said second module; and said second circuit element is a diode connected in series between said pair of cells.

9. The charger of claim 4 wherein said indicator is in contact with said element.

* * * * *